April 8, 1969 F. J. MIMKEN ETAL 3,437,835
COCHANNEL SIGNAL ELIMINATOR
Filed Dec. 27, 1965
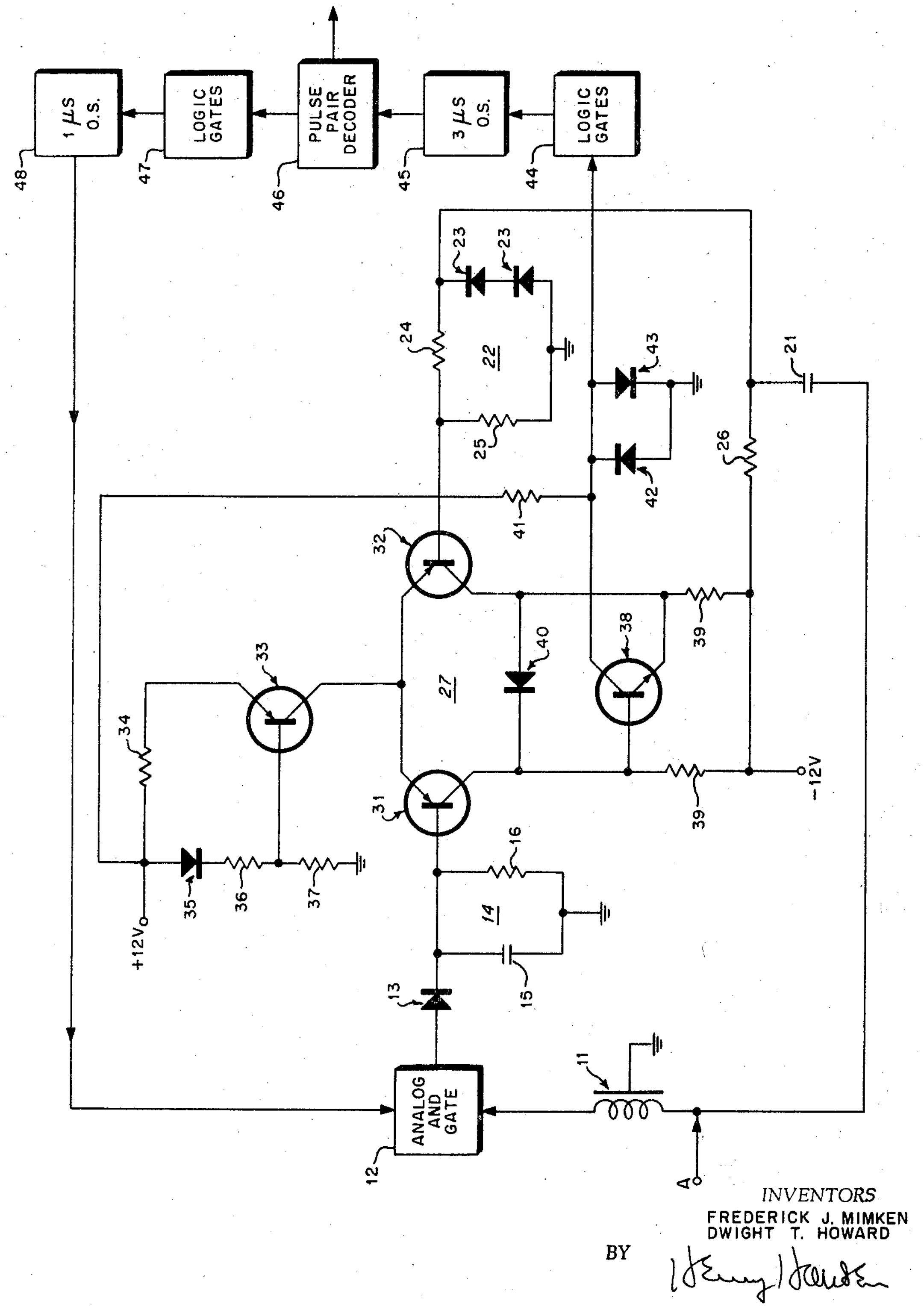
INVENTORS
FREDERICK J. MIMKEN
DWIGHT T. HOWARD
BY [signature]
ATTORNEY United States Patent Office 3,437,835
Patented Apr. 8, 1969

3,437,835
COCHANNEL SIGNAL ELIMINATOR

Frederick J. Mimken, Fairport, and Dwight T. Howard, Rochester, N.Y., assignors, by mesne assignments, to the United States of America as represented by the Secretary of the Navy Filed Dec. 27, 1965, Ser. No. 516,789
Int. Cl. H03k *5/20*
U.S. Cl. 307—235 6 Claims The present invention relates to a noise eliminating circuit in a pulse communication system and more particularly to a cochannel signal eliminator in a TACAN communication set.

In TACAN communication sets the signal transmitted comprises a pair of pulses spaced close together. The purpose of these pulse pairs is to increase the resistance of the set to the reception of noise pulses. In conjunction with this the set requires a threshold device both to filter out unwanted noise pulses and to eliminate the pulse pairs from the cochannel signals also received by the TACAN set. Threshold devices have been used in the past which relied on a fixed threshold. These have had the drawback of not responding to true pulse pairs when the signal is quite weak. Other threshold devices attempt to make the threshold level for each pulse dependent fully upon the level of the last preceding pulse. This has the drawback that if a noise pulse is received in between pulse pairs it may cause the threshold to be set too high.

The general purpose of this invention is to provide a cochannel signal eliminator and threshold detecting device which utilizes the height of the second pulse of each pair to set the threshold level for the detection of subsequent pulse pairs. Since the threshold setting device will not respond to any input pulse except the second pulse of a pair the threshold level can be neither raised nor lowered by incoming noise pulses. Logic means are also provided for preventing the insertion of pulse pairs from the TACAN cochannel signal. This serves both the function of eliminating such pulse pairs from the further circuits of the set and of preventing the threshold detector itself from setting its threshold in response to them. To accomplish this the invention contemplates an analog AND gate permitting passage of the signal into a charge storage network to which is compared the incoming video signal. The analog AND gate itself is actuated by the recognition of the valid pulse pair thereby permitting a predetermined portion of the second pulse of a valid pair to pass through into the charge storage network. Noise pulses will presumably be below the selected threshold or will not pass the pulse pair decoder due to failure to provide the second pulse at the proper time. Invalid pulse pairs, being weaker than valid pulse pairs, will not pass the threshold level set by the second pulse of a valid pair and, therefore, will not be permitted to pass through the analog AND gate to change the level on the charge storing network.

Accordingly, it is an object of the present invention to provide a cochannel signal eliminator in a TACAN communications set which permits the equipment to distinguish between valid and invalid pulse pairs.

Another object of the invention is to provide a threshold level according to the level of valid pulse pairs being received.

Other objects and many of the attendant advantages of this invention will be readily appreciated as the same becomes better understood by reference to the following detailed description when considered in connection with the accompanying drawing wherein:

The figure shows a block schematic circuit diagram of a preferred embodiment of the invention.

In the drawing the input video signals are brought into the circuit at point A. Each pulse is passed through a delay line 11 to an analog AND gate 12 which will pass the signal through under circumstances which will be recited subsequently. When each pulse is passed through it passes through a forward biased diode 13 to a charge storage network 14 comprising capacitance 15 and resistance 16. Circuit 14 will discharge according to a predetermined RC time constant determined by capacitance 15 and resistance 16 which is greater than the time between two pairs of pulses.

Each input pulse is also passed through a capacitance 21 to an input circuit 22 comprising diodes 23 and resistances 24 and 25. The cathode of one of the diodes 23 is connected through a resistance 26 to a −12 volt source.

Circuits 14 and 22 provide input signals to the opposite sides of a differential amplifier 27 which has two opposed transistors 31, 32 which receive the signals from circuits 14 and 22, respectively. The emitters of transistors 31 and 32 are connected through a resistance 34 to a 12 volt source. A bias network is provided for transistor 33 comprising diode 35 and resistances 36, 37. The collectors of transistors 31 and 32 are tied respectively to the base and emitter of a transistor 38. Each of the base emitter of transistors 38 are also connected through identical resistances 39 to a −12 volt source. A diode 40 is back biased between the base and emitter of transistor 38 to prevent excessive back voltage across the base emitter junction. The collector of transistor 38 is connected through a resistance 41 to the 12 volt source.

The output of the differential amplifier 27 is taken from the collector of transistor 38. It is clamped by two diodes 42, 43 within a narrow range which is, however, still sufficient to operate subsequent logic functions. The output pulses are passed to a set of logic gates 44 where other logic functions not relevant to the present invention are performed on it. These functions may include, for example, gating the output pulses with other pulses to exclude pulses at certain predetermined portions of a cycle. In any event, if a pulse is issued from logic gates 44 it activates a one-shot 45 for three microseconds. Each pulse in the pulse pair is thus passed on to a pulse pair decoder 46. Decoder 46 is a logic circuit of construction known in the art and not relevant to the present invention. Its purpose is to detect the presence of a pulse a predetermined time after another pulse. If such a second pulse occurs the decoder 46 will send a pulse out and will also send a pulse to logic gates 47. Logic gates 47 do logic functions not relevant to the present invention on pulses from decoder 46. These functions may, for example, be inhibiting gates designed to effectively eliminate the threshold detector from the circuit. In any event, if a pulse is allowed to pass through logic gates 47 from decoder 46, it actuates a one-shot blocking oscillator 48 for one microsecond. One-shot 48 enables analog AND gate 12 for one microsecond and permits it to pass through a portion of the second pulse of the pair coming in at A. The relation of the times of delay line 11 and various delays through the logic gates is such that the one microsecond portion of the second pulse passed through is at or near the maximum of the pulse.

The operation of the differential amplifier comparator 27 is as follows: With a signal on charge circuit 14 but none on the input circuit 22 transistor 31 will be turned off and transistor 32 will be conducting to some extent. The voltage on the base of transistor 38 will be lower than the emitter. Transistor 38 will, therefore, be substantially cut off and the voltage on the output will be slightly positive by an amount corresponding to the junction voltage on diode 43. When the voltage on the base of transistor 32 becomes higher than that on the storage circuit 14, transistor 32 will be cut off to a greater extent than transistor 31. The voltage on the base of transistor 38 will become higher than that on the emitter and transistor 38 will conduct to some extent. This will draw current through resistance 41 and cause the output voltage to drop sharply from its previous plus level to a small minus level depending then on the junction voltage of diode 42. This sharp drop of voltage is sufficient to operate logic gates 44. Comparator circuit 27 is quite fast in responding to an input pulse.

The operation of the cochannel eliminator will be apparent from a consideration of the circuit. As each pulse in succession comes in at point A it may be assumed at the start that it is higher than the level of charge on storage circuit 14. An output pulse will issue from the comparator circuit 27 into logic gates 44 and through to the pulse pair decoder 46. If a second pulse comes through it also will pass through the comparator assuming that it also is higher than the level on storage circuit 14. If it follows the first pulse by the proper time it will be detected in pulse pair decoder 46 and passed through to the one-shot 48 which will enable analog AND gate 12. Analog AND gate 12 will then permit a one microsecond length of that pulse to pass into storage circuit 14. When this happens repeatedly storage circuit 14 is charged up to essentially the peak voltage of the incoming pulses. The comparator 27 will then not respond to any pulses, either noise pulses or cochannel pulse pairs, which are at a level less than that on the circuit 14. Circuit 14 will discharge at a rate calculated to ensure that valid pulse pairs will be passed through taking into account normal decreases in signal level. If no signals are received for a period of time circuit 14 will completely discharge, which means that for a short time any pulse will be passed through by comparator 27. However, the storage circuit 14 will quickly build up to the peak level of the highest pulses coming in, which it is assumed are the valid pulse pairs. Analog AND gate 12 will permit pulses to pass into storage circuit 14 when pulse pair decoder 46 indicates a second pulse, which is to say that only the second pulse of the pair and not the first nor any other pulse coming into comparator 47 will have an effect on the level of storage circuit 14.

Obviously many modifications and variations of the present invention are possible in the light of the above teaching. It is, therefore, to be understood that within the scope of the appended claims the invention may be practiced otherwise than as specifically described.

What is claimed is:

1. A cochannel signal eliminator comprising:
- a storage network for storing an electrical charge thereon;
- comparator means for comparing the charge on said network with a succession of pairs of input pulses and issuing an output pulse for each input pulse of a level greater than the charge on said network; and
- a logic circuit for passing to said network the second of each of said pairs of pulses.

2. A cochannel signal eliminator as recited in claim 1 wherein said logic circuit comprises:
- means to sense the second of a pair of input pulses; and
- means in response to said sensing means to pass the second of said pulses to said network.

3. A cochannel signal eliminator as recited in claim 2 wherein said means to pass comprises an analog AND gate enabled by a signal from said means to sense.

4. A cochannel signal eliminator as recited in claim 2 wherein said means to sense comprises a pulse pair decoder receiving pulses from said comparator and searching for a second pulse a predetermined time interval after receiving a first one.

5. A cochannel signal eliminator as recited in claim 1 wherein said storage network comprises an RC network having a predetermined RC time constant greater than the time between two pairs of pulses.

6. A cochannel signal eliminator as recited in claim 1 wherein said comparator is a differential amplifier.

References Cited

UNITED STATES PATENTS 3,392,307 7/1968 Monnier ---------- 328—147 X

ARTHUR GAUSS, *Primary Examiner.*

J. D. FREW, *Assistant Examiner.*

U.S. Cl. X.R.

307—232; 328—146, 147, 151